US007937184B2

(12) United States Patent
Stemmle

(10) Patent No.: US 7,937,184 B2
(45) Date of Patent: May 3, 2011

(54) MAIL SORTER SYSTEM AND METHOD FOR PRODUCTIVITY OPTIMIZATION THROUGH PRECISION SCHEDULING

(75) Inventor: Denis J. Stemmle, Stratford, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 1101 days.

(21) Appl. No.: 11/544,349

(22) Filed: Oct. 6, 2006

(65) Prior Publication Data

US 2008/0086232 A1 Apr. 10, 2008

(51) Int. Cl.
*G06F 7/00* (2006.01)

(52) U.S. Cl. ........................................ 700/223; 209/584

(58) Field of Classification Search .................. 700/223, 700/224; 209/584, 583
See application file for complete search history.

(56) References Cited

U.S. PATENT DOCUMENTS

| | | | |
|---|---|---|---|
| 3,420,368 | A | 1/1969 | Sorrells |
| 3,452,509 | A | 7/1969 | Hauer |
| 3,587,856 | A | 6/1971 | Lemelson |
| 3,757,939 | A | 9/1973 | Henig |
| 3,889,811 | A | 6/1975 | Yoshimura |
| 3,901,797 | A | 8/1975 | Storace |
| 3,904,516 | A | 9/1975 | Chiba |
| 3,933,094 | A | 1/1976 | Murphy |
| 4,008,813 | A | 2/1977 | Leersnijder |
| 4,058,217 | A | 11/1977 | Vaughan |
| 4,106,636 | A | 8/1978 | Ouimet |
| 4,169,529 | A | 10/1979 | Hunter |
| 4,244,672 | A | 1/1981 | Lund |
| 4,507,739 | A | 3/1985 | Haruki |
| 4,627,540 | A | 12/1986 | Takeda |
| 4,688,678 | A | 8/1987 | Zue |
| 4,738,368 | A | 4/1988 | Shaw |
| 4,868,570 | A | 9/1989 | Davis |
| 4,874,281 | A | 10/1989 | Bergerioux |
| 4,891,088 | A | 1/1990 | Svyatsky |
| 4,895,242 | A | 1/1990 | Michel |
| 4,921,107 | A | 5/1990 | Hofer |
| 4,923,022 | A | 5/1990 | Hsieh |
| 4,965,829 | A | 10/1990 | Lemelson |

(Continued)

FOREIGN PATENT DOCUMENTS

JP 1159088 6/1989

(Continued)

OTHER PUBLICATIONS

"Development of in-process skew and shift adjusting mechanism for paper handling," American Society of Mechanical Engineers http://www.directtextbook.com, 1998.

*Primary Examiner* — Gene Crawford
*Assistant Examiner* — Ramya Prakasam
(74) *Attorney, Agent, or Firm* — Leland Schultz, Esq.; Roberts Mlotkowski Safran & Cole, P.C.

(57) ABSTRACT

A mail sorting system, method, and software product are provided for transitioning from an earlier phase to a later phase of mail sortation. Information acquired during the earlier phase is used in order to calculate, while continuing the earlier phase, a transition time. At the transition time, there would be sufficient remaining time to perform the later phase, in order to meet a deadline for completing the later phase.

31 Claims, 7 Drawing Sheets

U.S. PATENT DOCUMENTS

| | | | | |
|---|---|---|---|---|
| 5,031,223 | A | 7/1991 | Rosenbaum | |
| 5,042,667 | A | 8/1991 | Keough | |
| 5,119,954 | A | 6/1992 | Svyatsky | |
| 5,186,336 | A | 2/1993 | Pippin | |
| 5,291,002 | A | 3/1994 | Agnew | |
| 5,470,427 | A | 11/1995 | Mikel | |
| 5,480,032 | A | 1/1996 | Pippin | |
| 5,518,122 | A | 5/1996 | Tilles | |
| 5,718,321 | A | 2/1998 | Brugger | |
| 5,981,891 | A | 11/1999 | Yamashita | |
| 5,994,657 | A | 11/1999 | Maier | |
| 6,032,122 | A | 2/2000 | Gertner | |
| 6,079,570 | A | 6/2000 | Oppliger | |
| 6,082,521 | A | 7/2000 | Maier | |
| 6,126,017 | A | 10/2000 | Hours | |
| 6,227,378 | B1 | 5/2001 | Jones | |
| 6,276,509 | B1 | 8/2001 | Schuster | |
| 6,337,451 | B1 | 1/2002 | De Leo | |
| 6,347,710 | B1 | 2/2002 | Ryan | |
| 6,365,862 | B1 | 4/2002 | Miller | |
| 6,403,906 | B1 | 6/2002 | De Leo | |
| 6,435,353 | B2 | 8/2002 | Ryan | |
| 6,443,311 | B2 | 9/2002 | Hendrickson | |
| 6,561,339 | B1 | 5/2003 | Olson | |
| 6,561,360 | B1 | 5/2003 | Kalm | |
| 6,587,806 | B2 * | 7/2003 | Mangiameli et al. | 702/128 |
| 6,674,038 | B1 | 1/2004 | Latta | |
| 6,677,548 | B2 | 1/2004 | Robu | |
| 6,814,210 | B1 | 11/2004 | Hendzel | |
| 6,897,395 | B2 | 5/2005 | Shiibashi | |
| 6,946,612 | B2 | 9/2005 | Morikawa | |
| 6,953,906 | B2 | 10/2005 | Burns | |
| 6,994,220 | B2 | 2/2006 | Schererz | |
| 7,004,396 | B1 | 2/2006 | Quine | |
| 7,111,742 | B1 | 9/2006 | Zimmermann | |
| 7,112,031 | B2 | 9/2006 | Harres | |
| 7,138,596 | B2 | 11/2006 | Pippin | |
| 7,170,024 | B2 | 1/2007 | Burns | |
| 7,210,893 | B1 | 5/2007 | Overman | |
| 7,227,094 | B2 | 6/2007 | Oexle | |
| 7,235,756 | B2 | 6/2007 | De Leo | |
| 7,259,346 | B2 | 8/2007 | Svyatsky | |
| 7,304,260 | B2 | 12/2007 | Boller | |
| 7,329,824 | B2 | 2/2008 | Chamblee | |
| 7,378,610 | B2 | 5/2008 | Umezawa | |
| 7,396,011 | B2 | 7/2008 | Svyatsky | |
| 7,397,010 | B2 | 7/2008 | Wilke | |
| 7,397,011 | B2 | 7/2008 | Berdelle-Hilge | |
| 2002/0053533 | A1 | 5/2002 | Brehm | |
| 2002/0123855 | A1 * | 9/2002 | Mangiameli et al. | 702/128 |
| 2003/0006174 | A1 | 1/2003 | Harres | |
| 2004/0200761 | A1 * | 10/2004 | Hanson et al. | 209/584 |
| 2005/0125096 | A1 * | 6/2005 | Kechel | 700/224 |
| 2005/0169224 | A1 | 8/2005 | Baker | |
| 2006/0070929 | A1 | 4/2006 | Fry | |
| 2006/0124512 | A1 | 6/2006 | Quine | |
| 2006/0180519 | A1 * | 8/2006 | Carey et al. | 209/584 |
| 2006/0180520 | A1 | 8/2006 | Ehrat | |
| 2006/0191822 | A1 | 8/2006 | Avant | |
| 2006/0271234 | A1 | 11/2006 | Gaug | |
| 2007/0090029 | A1 | 4/2007 | Avant | |
| 2007/0131593 | A1 | 6/2007 | Burns | |
| 2007/0272601 | A1 | 11/2007 | Stemmle | |
| 2008/0011653 | A1 | 1/2008 | Stemmle | |
| 2008/0012211 | A1 | 1/2008 | Stemmle | |
| 2008/0027986 | A1 | 1/2008 | Stemmle | |
| 2008/0093273 | A1 | 4/2008 | Stemmle | |
| 2008/0093274 | A1 | 4/2008 | Stemmle | |
| 2008/0164185 | A1 | 7/2008 | Stemmle | |
| 2008/0179225 | A1 * | 7/2008 | Bowers et al. | 209/584 |
| 2008/0230449 | A1 * | 9/2008 | Stemmle | 209/584 |

FOREIGN PATENT DOCUMENTS

| | | |
|---|---|---|
| JP | 1271789 | 10/1989 |

* cited by examiner

MAIL SORTER SYSTEM AND METHOD FOR PRODUCTIVITY OPTIMIZATION THROUGH PRECISION SCHEDULING

TECHNICAL FIELD

The present invention relates generally to mail sortation, and more particularly to scheduling of mail sortation.

BACKGROUND OF THE INVENTION

Postal services are held accountable for achieving certain service levels of performance, and one particularly important criterion is on-time delivery. Postal services typically measure their on-time delivery performance by assessing the effectiveness of both the sorting system, and the delivery operations. In many countries, the target is 97% to 98% of first class mail delivered within one day of receipt by the postal service (hereinafter "the post"). Typically, the targets for standard class mail are less challenging: for example, 95% of mail delivered within three to five days of receipt by the post.

In centralized postal sorting systems, mail is usually passed through automated sorting systems multiple times. The United States Postal Service (USPS), for example, has invested in sufficient sorting equipment to be able to sort 80% of letter mail to delivery sequence before it leaves a centralized sorting facility. To accomplish this level of sorting, often the mail will be passed through the sorters between four and six times. Because the delivery commitments for first class mail are so demanding, the first class mail is generally sorted as soon as it is available. In typical centralized sorting operations, once the first class mail has been sorted, the operators will sort as much standard class mail as they can within the time periods available for sorting.

After the last pass through the sorters, the mail must be placed in mail trays and loaded onto trucks by the deadline for dispatching the mail to the delivery offices. Typically this deadline for dispatch is between 4:00 and 6:30 A.M., depending upon the distance of the delivery offices from the centralized sorting facility. If the mail is late being dispatched from the centralized sorting facility, it often arrives much later at the delivery offices, due to delays caused by rush hour traffic. So, the posts tend to be fairly rigid in insuring that the mail is on the truck and on the way to the delivery offices no later than the established dispatch deadlines.

The problem is determining how much standard mail the operators should mix in with the first class mail during the multiple sorting operations. Sometimes, this mixing of standard mail with first class mail is limited to the last two passes through the sorting machines. And, because the performance of the sorter is somewhat affected by the type of mail being fed, and the skill of the operators, the ability to predict the total time to complete each pass through the sorters is an approximation based on experience of the operators and supervisors. Supervisors will occasionally get that approximation wrong, due to variables that they cannot control, and they consequently miss the dispatch deadline, or will need to dispatch some portion of the mail before it is completely sorted. These uncontrollable variables include the skill and efficiency of the operator, the number of jams and other shutdowns of the sorting equipment, and variables in the mail itself, such as the thickness and size of the mail pieces. In order to minimize the possibility of missing the dispatch deadline, some supervisors will err on the side of caution, and instruct the sorter operators to hold back some of the standard class on the second to last run in order to make sure that the last run through the sorter can be completed prior to the dispatch deadlines.

Therefore, sorting operations are often not as efficient as they could be. The total volume of mail run through the sorters falls well short of the ideal. And, mail that is run through the sorters—but that does not finish the last pass or two through the automated sorting equipment—is sometimes dispatched unsorted to the delivery offices, where it is sorted by hand. Manual sorting of mail is the most time-consuming and expensive way to process mail.

What is needed is a way to know precisely how much mail is to be sorted in the last pass or two, and precisely how long it will take to sort that mail so that the maximum amount can be sorted automatically, while still ensuring that the dispatch deadlines are met. This problems exist both for conventional sorters, as well as for damp-based sorters wherein mail is put in clamps, and the mail is sorted by manipulating the clamps instead of by directly guiding the mail pieces. Examples of such a clamp-based system can be found in International Application WO 2006/063204 filed 7 Dec. 2005 titled "System and Method for Full Escort Mixed Mail Sorter Using Clamps" and can also be found in U.S. Provisional Application No. 11/519,630 filed 12 Sep. 2006 titled "Sorter, Method, and Software Product for a Two-Step and One-Pass Sorting Algorithm," which are both incorporated herein by reference in their entirety. The problem also exists for macro-sorters, which are sorters that simultaneously sort inbound as well as outbound mail. The concepts of macro-sorting are described, for example, in U.S. Provisional Application No. 60/669,340 filed 5 Apr. 2005, titled "Macro Sorting System and Method" which also incorporated herein by reference in its entirety.

SUMMARY OF THE INVENTION

The present invention provides a controllable way to deal with uncontrollable variables from the last pass(es) through the sorter, so that the time to complete the job can be precisely predicted based on the specific mail pieces to be sorted. In addition, the invention provides both a visible indication of when the last pass must be started through the sorter in order to meet the deadline, as well as providing an alert when the last pass must be started. In this way, the maximum amount of mail can be loaded into the sorter in order to deliver all of the first class mail and a maximum amount of standard or other class mail each day.

The present invention can be used both in a clamp-based sorter wherein mail is put in clamps, and the mail is sorted by manipulating the clamps instead of by directly guiding the mail pieces, as well as in other types of sorters, but it has special advantages in the context of a clamp-based sorter. A unique feature of clamp-based sorter is the ability to predict exactly how long it will take to process the last pass through the sorter, because the last pass is a fully automated step with no operator actions involved. The exact number of pieces and characteristics of the mail to be processed through the last pass has been previously measured and stored in a database, and actual pieces are stored in the sorter. For conventional sorters, an equivalent capability of predicting the time to complete the last pass based on measurements and data taken on the mail loaded during the second last pass is also enabled by this invention.

BRIEF DESCRIPTION OF THE DRAWINGS

The accompanying drawings illustrate presently various embodiments of the invention, and assist in explaining the principles of the invention.

DETAILED DESCRIPTION OF AN EMBODIMENT OF THE INVENTION

An embodiment of the present invention will now be described. It is to be understood that this description is for purposes of illustration only, and is not meant to limit the scope of the claimed invention.

Figure 7:
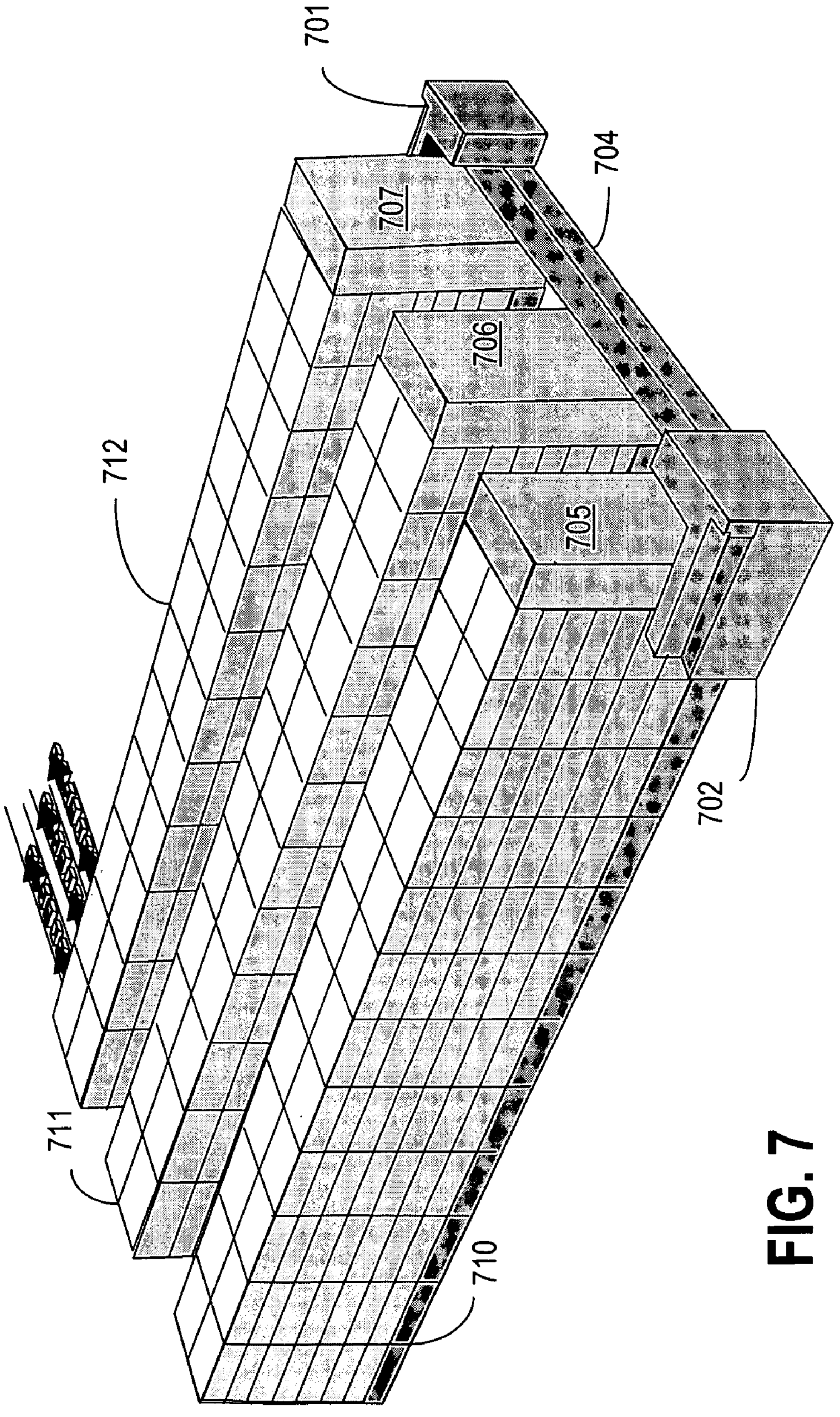
FIG. 7 shows a triple bank sorter according to an embodiment of the present invention.

It is possible to scale up a merge and sequence sorter concept, so that multiple zones of mail can be loaded and sorted to delivery sequence. FIG. 7, for example, shows a sorter that can acccept unsorted mail destined for between 100 and 250 routes and sort it all to delivery sequence. The concepts of macro-sorting, and simultaneously sorting inbound and outbound mail, are described in U.S. Provisional Application No. 60/669,340 filed 5 Apr. 2005, titled “Macro Sorting System and Method” which has been incorporated herein by reference.

The inbound sorting operations (merging and sequencing) for these types of sorters are typically conducted in three phases. Phase I involves loading all the mail into the sorter using one or more infeed stations. Each piece of inbound mail is loaded into a clamp, transported in face-to-face orientation with respect to other clamped mail pieces, and sorted into groups of one or more routes of mail and stored in storage legs in the upper tiers of the sorter. This could occur over a time period of 21 hours or less. Phase II starts after all the mail is loaded into the sorter during phase I, and includes moving mail to the lowest tier one batch at a time, and sorting first into batches of 20 to 60 addresses, which are then sorted to delivery sequence. When the mail is sorted to sequence, it then enters phase III, during which it is loaded into trays and sent to dispatch.

For this type of sorter configuration, it will be noted that the time to complete phase I varies, because of all the uncontrollable variables. These uncontrollable variables include the total number of pieces to be sorted and delivered that day, the type of mail (size, weight, dimensions), how much of each type of mail can be fed into the sorter using high speed letter feeders (typically these feed at 36,000/hour), how much must be fed using flats feeders (at 10,000/hour), and how much must be fed in manually (at 3,600/hour). These feed-in rates will also be affected by operator skill and diligence.

In addition, for a clamp-based sorter in which the mail is transported in face-to-face orientation, the time to move the mail into and out of storage during phase I will be variable, depending on the amount of mail loaded and the thicknesses of mail pieces. The transport speeds are a constant, but the number of pieces being transported is an uncontrollable variable that will change with each day’s mail. The transports may include ways to transport clamped mail at fixed pitches such that thicker mail pieces will occupy more pitches than thinner pieces. The storage areas may also be designed with fixed pitches, and the number of pitches to be occupied in the sorter by each mail piece depends on the thickness of each piece. And, therefore, the number of pieces that can be transported within the sorter per unit of time will be a function of the thickness of the pieces (and the pitches occupied) being transported. Hence, the time to complete phase I will depend on a host of uncontrollable variables.

It will be noted that during phase I, all the important parameters about the mail being loaded are measured and stored in a database. For the purposes of this discussion, the key attributes of the mail to be used include the number of pieces, and the number of pitches occupied by those pieces.

In a clamp-based sorter, Phase II, on the other hand, can be fully automated. No operator skill or diligence is required other than commanding the sorter to start this phase. Following that, the sorter systematically moves the mail, previously sorted and stored in batches consisting of one or more routes, from its storage location inside the sorter to the lowest tier to conduct the sort to sequence operations. The batches of mail are transported one right after another through the bottom tier, and thereafter they are stacked into trays and sent to dispatch.

The time to complete phases II and III can be precisely calculated. The total number of pitches occupied by the mail to be sorted in phase II will be known after phase I is halted. The total distance that this mail must be moved will also be known as a function of the sorter geometry and the number of pitches occupied. Since the transport velocity is a constant (for example, 3 in/sec), the precise time to sort the mail for phase II can be easily calculated. A typical equation to perform this calculation might look like this: Time for Phase II=[Sorter Path Length+(Total Pitches Occupied)(Efficiency Factor)]/[Transport Speed].

In fact, if the last dispatch deadline is, for instance 6:30 A.M., then the time to complete phases II and III can be subtracted from the dispatch deadline—and displayed appropriately. So, for example, the sorter user interface might continuously update the time that phase II must be started throughout the loading of mail during phase I. Early in phase I, when only about 20% of the day’s mail has been fed in, the display might say “Phase II must start no later than 5:47 a.m.” Later on, after 99% of the mail has been loaded in phase I, the message on the display will then show “Phase II must start no later than 3:12 a.m.” In other words, the time calculated and displayed for the start of phase II will be continuously updated, changing to an ever earlier time, as additional mail pieces are loaded in during phase I.

There will come a time when this calculated time will be exactly the same as the actual time (i.e. the calculated time line and the actual time line intersect.) At this point, the sorter will actuate an alarm (such as an audible signal or a visual display alert) to make certain that the operator knows it is time to halt phase I and initiate phase II.

Figure 1:
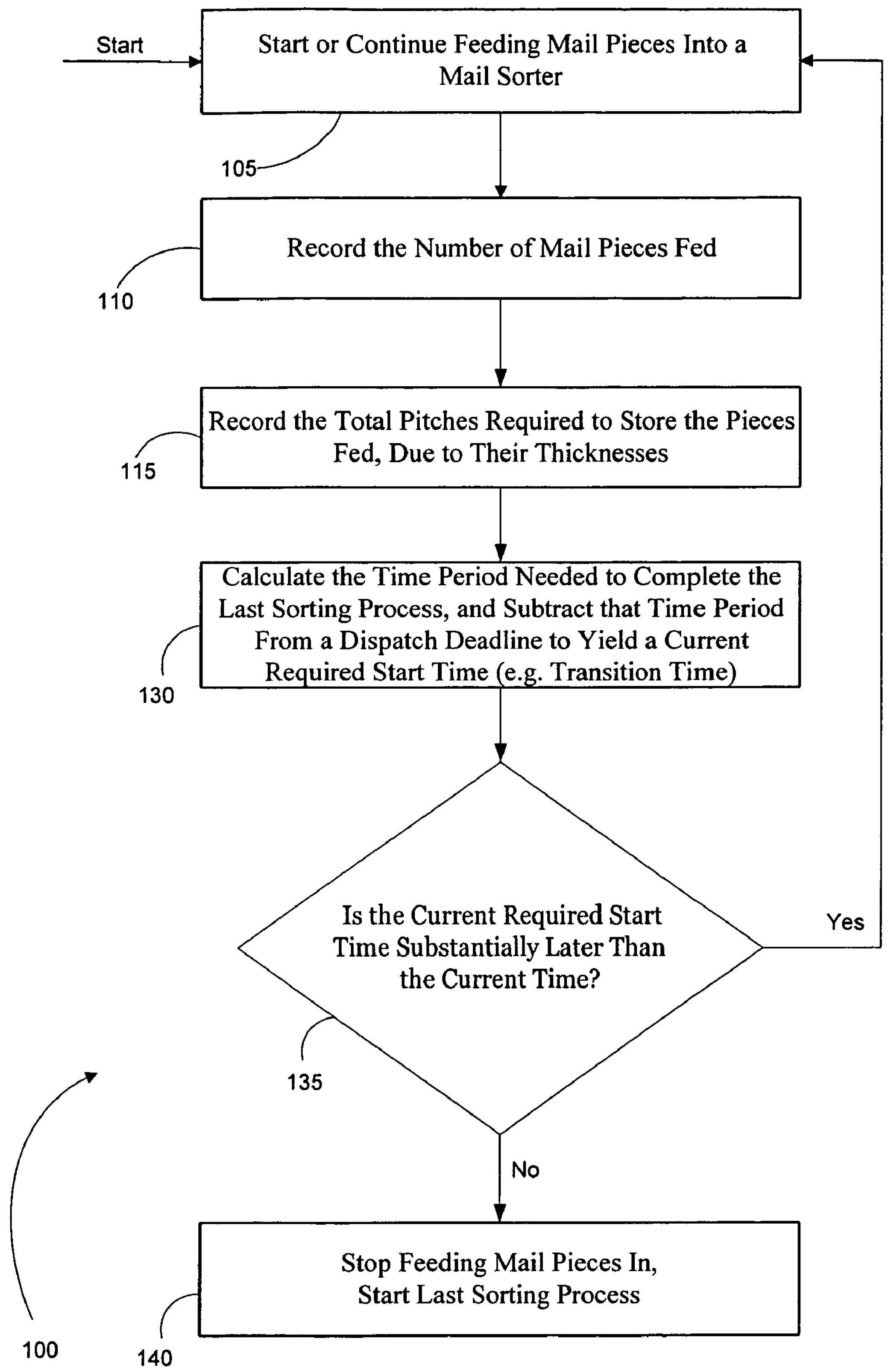
FIG. 1 is a flow chart showing a method according to an embodiment of the present invention.
Figure 4:
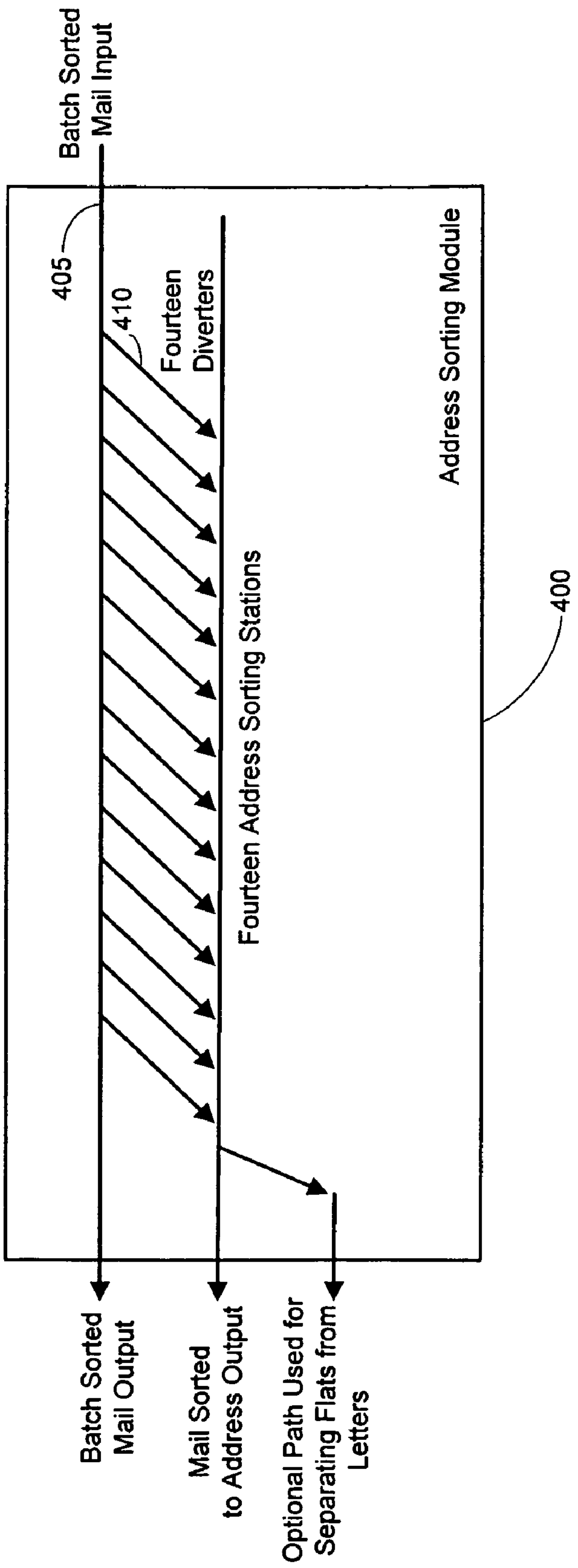
FIG. 4 shows an address sorting module according to an embodiment of the present invention.

As seen in accompanying FIG. 1, the method 100 begins at the step of feeding mail pieces into a sorter 105, which may be regarded as a phase I. Mail pieces are fed into the system in this step 105, and are then sorted into large batches, or groups of one or more routes of mail, and stored in storage legs as shown in FIG. 6, which are located in the upper tiers of the sorter as shown in FIG. 7. During and after being fed into the system, the mail pieces are counted and their number is recorded 110. Also recorded 115 are the pitches required to store those mail pieces, due to their respective thicknesses. This recorded information is then used to calculate 130 the time period that would be needed to complete thethe second phase, and that time period is subtracted from a dispatch deadline in order to yield a current required start time for starting a transition from the first phase to the second phase (this start time will also be referred to as a transition time). If the current required start time (i.e. the transition time) is substantially later than the actual current time, then 135 the method continues from rectangle 105. However, if the transition time is not substantially later than the actual current time, then the mail feeding operation is stopped 140, and second phase is started. The second phase involves moving mail stored in the large storage modules (see FIG. 6) which are located in the upper tiers of the sorting system shown in FIG. 7, through multiple sort to small batch modules shown in FIG. 5, and each small batch is finally moved through one or more sort to address modules as shown in FIG. 4. The sort to small batch modules and the sort to address modules are located on the lowest tiers of the multi-bank sorter system shown in FIG. 7.

Figure 2:
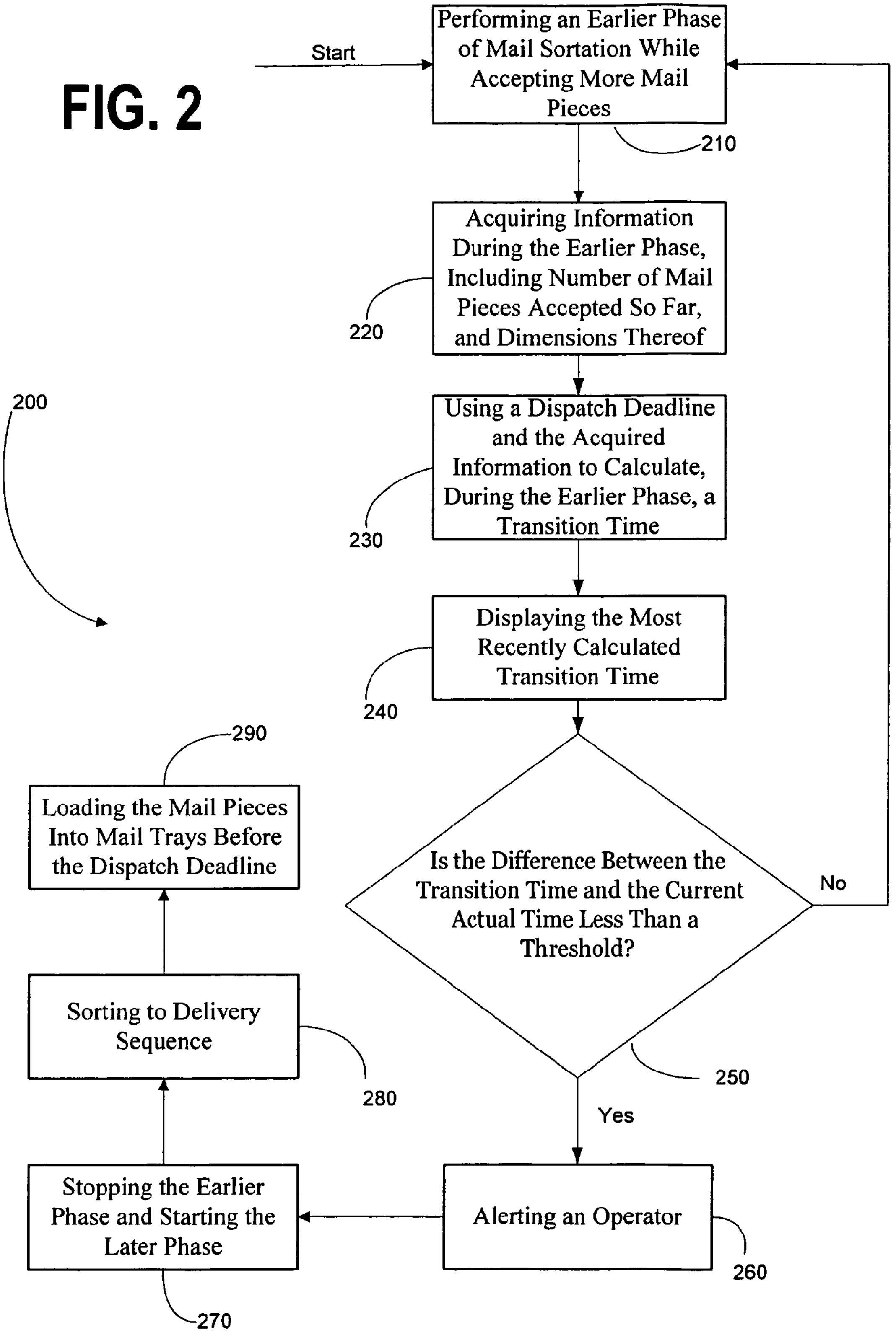
FIG. 2 is a flow chart showing a further method according to an embodiment of the present invention.

A variant of the method shown in FIG. 1 is the method 200 shown by the flow chart of FIG. 2. In FIG. 2, the flow chart shows how to stop 270 an earlier phase of mail sortation, and start a later phase of mail sortation. The later phase may include one or more sorting operations. The method shown in FIG. 2 starts with performing 210 the earlier phase while accepting more mail pieces into the system. During the earlier phase, information is acquired 220, including the number of mail pieces accepted, and at least some dimensional information about them. Also during the earlier phase, a transition time is calculated 230 using a dispatch deadline as well as the information already acquired in step 220. The transition time is a time at which there would be sufficient remaining time to perform the later phase, and this transition time is displayed 240 so that an operator can see what it is. If the difference between the transition time and the current actual time is less than a threshold value 250, then an operator is alerted 260, so that the operator can stop 270 the earlier phase. However, if the threshold was not reached, then the method continues as before 210. Ultimately, the threshold will be reached, after which the operator will initiate the later phase in which the mail pieces will be sorted 280 to delivery sequence, and loaded 290 into mail trays before the dispatch deadline.

The sorter system in this embodiment of the invention enables an unprecedented level of precision in determining exactly when the later phase including the phase II operations must be started, because the clamp-based phase II is fully automated without any operator involvement. But, a similar approach could also be applied to conventional sorting systems. In typical central sorting centers, multiple sorting systems are used in each phase. Also, for each pass, one or more operators are required to load mail into feeders, and one or more operators may be required to unload the mail from the sorting bins and into trays. In addition, auxiliary support systems are required to support the sorters—such as the tray storage and retrieval systems that take the trays of mail after they are unloaded in one pass and present them to the feeder operators in the correct order to be fed back into the sorters during the second pass.

The performance of all of these systems for the last pass or two of sorting is reasonably predictable based on the data that can be collected during early passes. Examples of data that can be collected include the piece count of mail fed, how long it took to feed it, the number of trays full of mail unloaded and stored, et cetera. As with a clamp-based sorter, the transport rates are a known constant. The speed of the sorter combined with the collected data on the number of pieces and the average time to feed those specific pieces can be put into a simple equation to determine exactly how long it will take to complete the last pass through the sorter. A typical equation might look like this: [Last Pass Time]=[Total Pieces Fed on Second-to-Last Pass]/[(Number of Sorters)(Measured Feed Rate)]

However, if multiple sorters are used in each of the phases, then the start time for the last phase may in fact be a series of start times for each of the sorters involved in sorting the last pass. Typically, any one of the multiple sorters will be assigned to sort the mail for specific routes or zones (e.g. 20 routes/zone). In this situation, during the second to last pass, the number of pieces sorted to the zones to be fed into any specific sorter for the final pass can be separately recorded. In this case, multiple equations like the one mentioned in the previous paragraph will be used. Each numerator for each equation will include only the number of pieces sorted during the second-to-last pass that will be fed into the specific sorter that will sort those pieces for the last pass.

For example, suppose 10 sorters are being used in a sorting center. And suppose mail destined for 100 zones will be sorted. For the last pass, the sorting plan is that sorter number one will be assigned to sort mail for zones 1 to 10, sorter number two will sort mail for zones 11 to 20, et cetera. During the second to last pass, all the mail destined for zones 1 to 10 sorted on all ten sorters will be recorded and applied in the equation. A display can be used to show the start time for the last pass for each of the ten sorters. So, for example, the display at any point in time, based on the cumulative mail sorted during the second to last pass in all sorters, might display the following: "The last pass for sorter number one must start at 4:15 AM, the last pass for sorter number two must start at 3:47 AM, the last pass for sorter number three . . . " et cetera.

Figure 3:
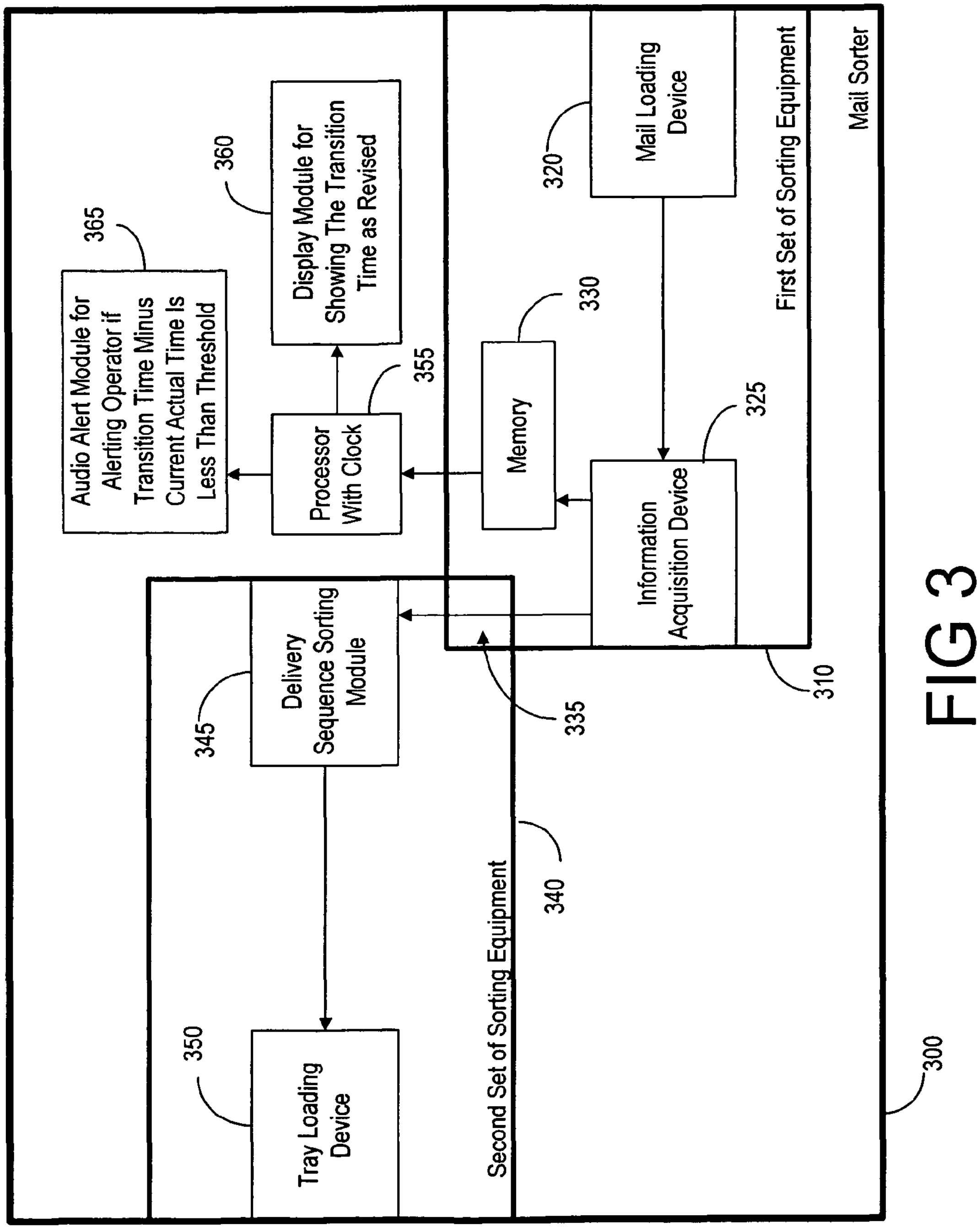
FIG. 3 is a block diagram showing a mail sorter according to an embodiment of the present invention.

Turning now to FIG. 3, this shows a single mail sorter according to an embodiment of the present invention. The mail sorter includes a first set of sorting equipment 310 as well as a second set of sorting equipment 340, although these two sets are not necessarily distinct and may have a certain amount of overlap 335. The first set of sorting equipment includes a mail loading device 320 for loading mail piece into the mail sorter. The earlier sorting pass occurs in the first set of sorting equipment 310, and this set includes an information acquisition device 325 that acquires information about the mail pieces, and sends that information to a memory 330. Eventually the mail will transition to the second set of sorting equipment 340 which includes a delivery sequence sorting module 345 and a tray loading device 350 (other sorting modules may be included as well). The transition of the mail pieces from the first set of sorting equipment 310 to the second set of sorting equipment 340 is largely governed by a processor 355 which is equipped with a clock. The processor informs and updates a display module 360 so that the display module displays the transition time at which a timely transition would have to be made from the first set 310 to the second set 340 in order to meet the dispatch deadline. The processor also informs an alert module 365 when the transition time minus current actual time is less than a threshold, so that the transition must be made immediately.

Algorithms for implementing the precision scheduling of the present invention can be realized using a general purpose or specific-use computer system, with standard operating system software conforming to the method described above. The software product is designed to drive the operation of the particular hardware of the system. A computer system for implementing this embodiment includes a CPU processor 355 or controller, comprising a single processing unit, multiple processing units capable of parallel operation, or the CPU can be distributed across one or more processing units in one or more locations, e.g., on a client and server. The CPU may interact with a memory unit 330 having any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

For sorting configurations in which sort to delivery sequence is a functional requirement, an average of five mail pieces will likely be sorted to each address in embodiments for use in the United States, and an average of two to three will be sorted to each address in typical European applications. A sorter module with 14 to 20 paths between the input side (unsorted mail) and the sorted side is an appropriate design. FIG. 4 shows an example of this type of sorting module, which can be referred to as a sort-to-delivery-sequence module 400.

As mentioned, this embodiment of the invention includes batch sorting modules, for sorting large batches to small batches, as well as address sorting modules for sorting to delivery sequence. FIG. 4 shows the address sorting module 400. These address sorting modules may have the following functions and characteristics, in an embodiment of the invention that utilizes clamps to hold the mail pieces.

Figure 5:
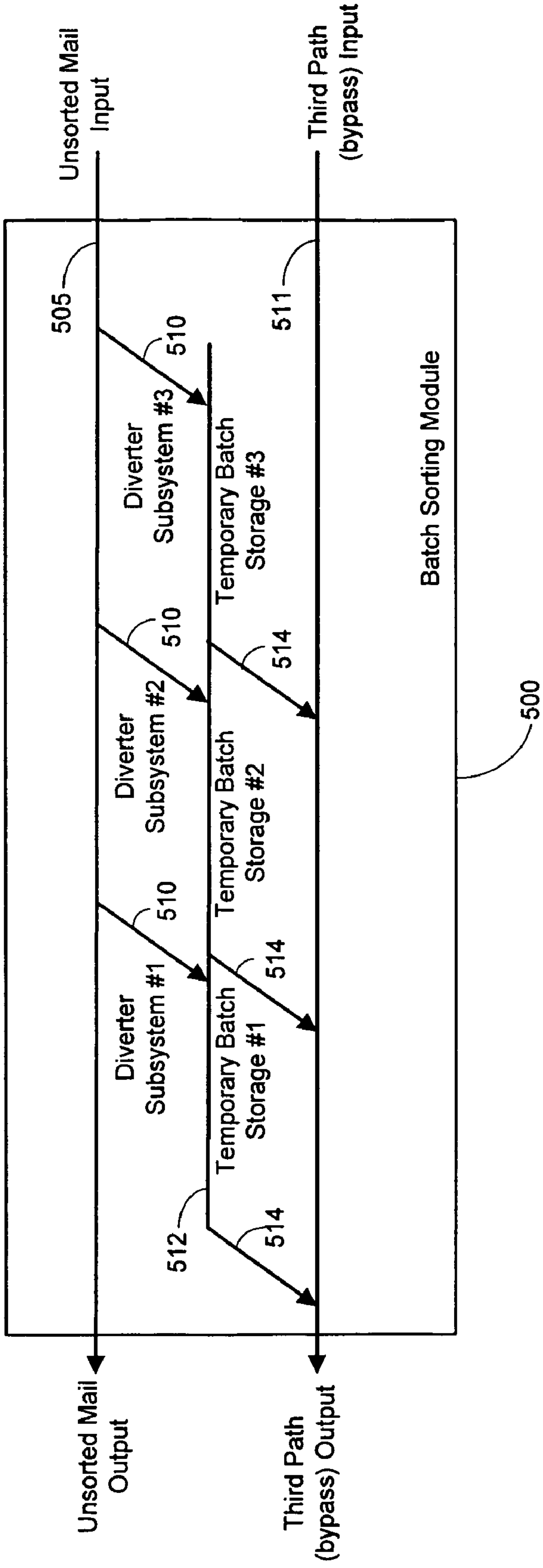
FIG. 5 shows a batch sorting module according to an embodiment of the present invention.
Figure 6:
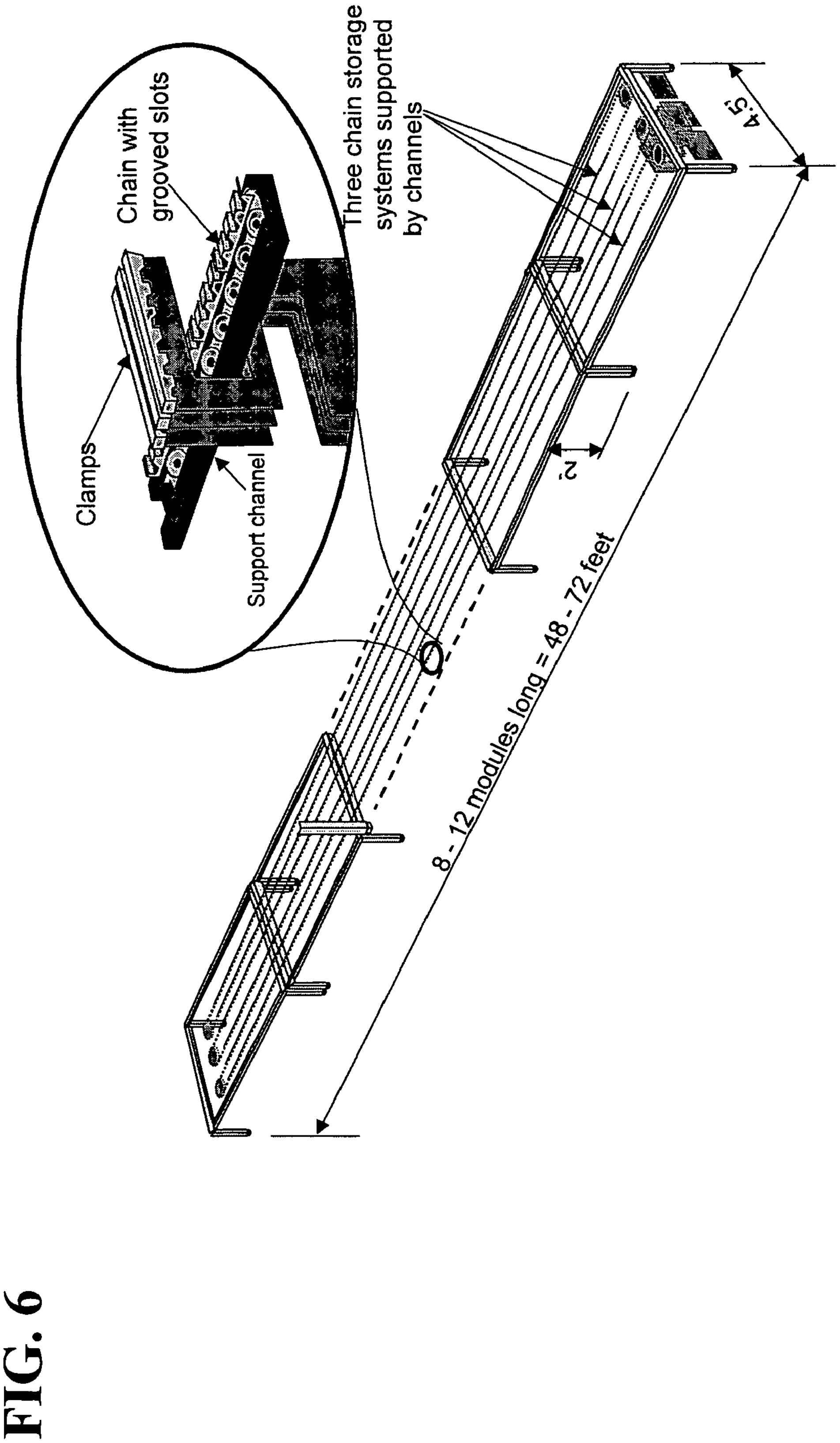
FIG. 6 shows a route storage module, according to an embodiment of the present invention.

The address sorting module will accept sequential batches of clamped mail from the third path 511 of the upstream batch sorting module 500 shown in FIG. 5, and will also accept information on the clamp identities and instructions for the disposition of each clamp (and mail piece) from a master controller or processor. The address sorting module 400 will read clamp identities as they enter the sorting module.

Each address sorting module will have a first path 405 for transporting clamped unsorted mail, which is either aligned with the third path of the upstream module when the upstream module is a batch sort module, or with the first path when the upstream module is an address sorting module. The input to this first path of the address sorting module is a batch of clamped mail handed off from an upstream module, each batch containing mail destined for a number of addresses not to exceed the number of address sorting stations. The outputs to this first path of the address sorting module include fourteen diverter stations (in the present example), in order to move the mail sideways off the transport, and a means to hand the partial batches of mail to additional address sorter modules downstream.

In the current example, each address sorting module has fourteen diverter subsystems 410 to move mail from the first mail path 405 to the fourteen assignable address stations 415. These diverter subsystems could operate identically to the three diverter systems designed for the small batch sorting modules (described later), and preferably have identical components.

Moreover, each address sorting module will have fourteen mail storage transports for storing mail destined for each address. There are two inputs to each of these address storage transports: the first input is a diverter transport carrying clamps from the first (batch) mail path, and the second input includes clamps handed off from an upstream address storage transport. The single output for each address sorting transport will pass the mail onto the next address storage transport—which may be the first address storing transport in the next module. The last address storing transport will hand the mail off to an output (de-clamping or stacking) module.

The storage capacity of each address storage transport may be a maximum of 10 clamps each holding mail pieces 0.2 inches thick or less. The capacity will be reduced when the batch being stored contains thicker mail pieces. The intent of this capacity target is to accommodate European routes where each address receives an average of 2.5 mail pieces per day. The 10 pitch storage system will accommodate heavy mail days of up to 10 of the thinnest pieces per address, or will accommodate heftier average thickness of each piece being up to 1.0 inches thick, (or some combination of these two possibilities.) Note that this storage capacity for each address station is four times the average mail to be sent to each address each day.

As an example, one configuration of the sorter may have a total of 28 address stations to sort mail previously batched for 25 addresses; these address stations are provided by two address sorting modules per sorting system, each sorting module having a 14-address sorting capability. Thus, three address stations can be used as overflow for specific addresses that receive more than the ten-piece maximum storage capability of the single address station.

FIG. 5 shows a small batch sorting module 500 according to an embodiment of the present invention. The small batch sorting module will accept a queue of clamped mail from one or more large batch storage areas, and will also accept information on the clamp identities and instructions for the disposition of each clamp (and mail piece) from the master controller or processor.

Each small batch sorting module will have a first path 505 (i.e. unsorted path) for transporting clamped mail that has not yet been sorted to small batch; the outputs may include, for example, three diverter stations to move the mail sideways off the transport, and a means to hand the unsorted mail off to a sorter module or an output module downstream.

Each small batch sorting module will have, for example, three diverter subsystems 510 to move mail from the unsorted path 505 to respective temporary batch storage stations 512. The diverter subsystems will have three major sub-components. First, a diverter subsystem will have a means to move one clamp off the unsorted mail transport and onto a diverter transport without disturbing the clamp before or after the diverted clamp on the unsorted mail transport. The actuator for this mechanism will be responsive to commands from the module controller. The cycle time for the diverting mechanism will be sufficient to enable diverting of either single or adjacent clamps onto the diverting transport. Second, a diverter subsystem will have a transport for transporting diverted clamps from the unsorted mail path to the temporary batch storage area. It is expected that this transport will be positioned at an angle from the unsorted path such that the component of velocity parallel to the unsorted path will match the speed of the unsorted path. Hence, the relative motion between the mail pieces is limited to mail moving sideways out of the queue of unsorted mail. Third, a diverter subsystem will have a means to transfer the clamps from the diverting transport to the batch storage transport.

According to this embodiment, each small batch sorting module will have three (3) temporary batch storage transports (or stations) for storing batches of mail. There are as many as two inputs to each batch storage transport: the diverter transport 510 carrying clamps from the unsorted mail path 505, and clamps handed off from an upstream batch storage transport. Likewise, there are as many as two outputs for each batch storage transport: an output 514 to the third path/exit transport 511, and an output to a downstream batch storage transport.

The operation of the batch storage transport will be intermittent; it will advance all mail pieces stored whenever a new piece has been added from either of the two inputs. The storage capacity of each batch storage transport may be a maximum of 115 clamps each holding mail pieces 2 mm thick or less. The capacity will be reduced when the batch being stored contains thicker mail pieces. The intent of this capacity target is to satisfy two objectives: first, capacity to hold mail for 25 addresses on European routes, each address receiving an average of 2.5 mail pieces per day, the average thickness of each piece being 1.3× the standard pitch of 0.2 inches and, second, and capacity that allows 40% excess capacity for high volume mail days.

As mentioned, each small batch sorting module will have a third path (i.e. batch output path) 511 for advancing clamped mail past downstream batch storage transports, directly to other modules down stream such as the address sorting modules or the stacker modules. The third path transports will accept clamped mail from any of the three batch storage transports, or from the third path in an upstream module. The third path will transfer the clamped mail to the input of the third path on the next downstream module. The third path speed will be compatible with the rate of transferring damped mail onto the transport. Mail will be transferred to the third path under the following conditions: for the merge and sequence operation, when the last clamp having unsorted mail passes the diverter station associated with the batch storage transport, the clamped mail stored on the batch storage transport can be transferred to the third path. This empties the batch storage transport so that the next large batch of mail can be started down the unsorted mail path. Note the possibility that the unsorted path may be utilized as (or transformed into) the batch output path once all of the mail pieces have been diverted from the unsorted path.

The first stage of sorting operations involves feeding mail, measuring one or more of its dimensions, scanning and interpreting the destination address of each mail piece, and loading it into clamps—all of which is done in the modules 701 and 702 shown in FIG. 7. A sorter controller includes a database which stores the scanned and measured information and associates it with a unique clamp identifier for the clamp holding the mail piece. The clamped mail is transported from the feeding modules 701 and 702 to one of three sorter banks 710, 711, or 712 via clamped mail transport 704. The two feeding modules and the three sorter banks in FIG. 7 are shown only as an example, and it will be understood that from one to eight feeders and from one to 15 sorter banks might be included in a practical sorting system. The sorter controller commands one of three diverters on the transport 704 (not shown) to divert each piece of clamped mail off transport 704 and onto one of three spiral elevator transports 705, 706, or 707 depending on the sorted destination of the mail piece. The controller further commands one of multiple diverter mechansims in the spiral elevator transports to divert each clamped mail piece off the spiral elevator transport and into an appropriate large batch storage area designated to receive mail destined for a range of adjacent addresses including the address for each clamped mail pieces diverted thereto. The diverting mechanisms on transport 704 and spiral elevators 705, 706, and 707 are similar to 510 shown in FIG. 5. In this first phase of operation, the random order mail pieces are sorted to large batches containing all the mail destined for addresses on one or more routes.

Mail that is initially sorted into large batches, or groups of one or more routes of mail, is stored in storage legs as shown in FIG. 6, which are located in the upper tiers of the sorter as shown in FIG. 7. Subsequently, mail stored in the large storage modules (see FIG. 6) which are located in the upper tiers of the sorting system shown in FIG. 7, are transported through multiple sort-to-small-batch modules shown in FIG. 5, and each small batches is finally moved through one or more sort-to-address modules as shown in FIG. 4. The sort-to-small-batch modules and the-sort-to-address modules are located on the lowest tiers of the multi-bank sorter system shown in FIG. 7.

It is to be understood that all of the present figures, and the accompanying narrative discussions of preferred embodiments, do not purport to be completely rigorous treatments of the methods and systems under consideration. A person skilled in the art will understand that the steps and stages of the present application represent general cause-and-effect relationships that do not exclude intermediate interactions of various types, and will further understand that the various structures and mechanisms described in this application can be implemented by a variety of different combinations of hardware and software, and in various configurations which need not be further elaborated herein.

What is claimed is:

1. A method for transitioning from an earlier phase to a later phase of mail sortation, comprising:

performing the earlier phase of mail sortation, before the later phase;

acquiring information during the earlier phase comprising at least a total number of pitches occupied by the mail to be sorted in the later phase known after the earlier phase is halted; and using the information in order to calculate, while continuing the earlier phase, a transition time at which there would be sufficient remaining time to perform the later phase prior to a deadline for completing the later phase, wherein using the information to calculate the transition time is repeated in order to calculate, before the earlier phase is stopped, a revised value of the transition time.

2. The method of claim 1, wherein an increasing number of mail pieces enter the earlier phase of mail sortation as time goes by, before the earlier phase is stopped; and, wherein the revised value is larger than an unrevised value of the transition time.

3. The method of claim 2, wherein the information used to calculate the transition time comprises the number of mail pieces and at least one characteristic of at least one of the mail pieces that have entered the earlier phase.

4. The method of claim 1, further comprising determining whether the earlier phase should be stopped, based at least partly on a difference between the transition time and current actual time.

5. The method of claim 4, wherein it is determined to stop the earlier phase if the difference is less than a threshold.

6. The method of claim 1, wherein the later phase of mail sortation includes loading the mail pieces into mail trays.

7. The method of claim 1, wherein the earlier phase of mail sortation comprises sortation to a first set of batches, wherein the later phase of mail sortation comprises sortation to a second set of batches, and wherein each of the first set of batches is larger than each of the second set of batches.

8. The method of claim 7, wherein the later phase of mail sortation further comprises sortation to delivery sequence.

9. The method of claim 1, wherein calculation of the transition time comprises: calculating an expected duration for performing the later phase; and, subtracting the expected duration from the deadline.

10. The method of claim 1, wherein the earlier phase comprises loading mail pieces into a sorter and sorting the mail pieces into a first set of batches; and, wherein the later phase comprises sorting the first set of batches into smaller batches.

11. The method of claim 10, wherein the later phase further comprises sorting the smaller batches to delivery sequence.

12. The method of claim 1 further comprising recording the information about the mail pieces during the earlier phase.

13. The method of claim 1, wherein the earlier phase includes sorting the mail pieces in a first pass, to a first degree of sortation;

wherein the later phase includes sorting the mail pieces in a second pass, to a second degree of sortation;

wherein calculating the transition time includes calculating a time period required to complete the second pass, based at least partly on the information recorded about the mail pieces during the first pass; and wherein the method further comprises using the transition time to display a specific start time at which the second pass must commence in order to meet the deadline.

14. The method of claim 13, wherein the information includes at least one of the following: a number of the mail pieces, a dimension of at least one of the mail pieces, a thickness of at least one of the mail pieces, and a destination of at least one of the mail pieces.

15. The method of claim 13, further including alerting an operator substantially at the specific start time.

16. The method of claim 13, wherein the first pass comprises moving the mail pieces into the at least one mail sorter, and wherein the second pass comprises moving the mail pieces out of the one or more mail sorter.

17. The method of claim 13, wherein the at least one mail sorter is identical to the one or more mail sorter; and wherein the earlier phase is preceded by another phase of mail sortation.

18. The method of claim 1, wherein information further includes:

total number of mail pieces to be sorted;

type of mail pieces; and speed of feeders used for the type of mail.

19. The method of claim 1, further comprising calculating a time to complete the later phase, the calculating comprising: [Sorter Path Length+(Total Pitches Occupied)(Efficiency Factor)]/[Transport Speed].

20. The method of claim 1, wherein the revised value of the transition time is continuously updated, changing to an earlier time as additional mail pieces are loaded in during the earlier phase.

21. The method of claim 1, wherein the information is used to calculate a time for completion of the later phase, which is subtracted from a dispatch deadline to a current required start time for stating the transition from the earlier phase to the later phase.

22. The method of claim 21, wherein:

if the current required start time is substantially later than an actual time, then sorting in the earlier phase continues; and if the current required start time is not substantially later than an actual time, then sorting in the earlier phase stops and the later phase begins.

23. A mail sorting system, comprising:

a first set of sorting equipment, configured to perform an earlier phase of mail sortation;

a second set of sorting equipment, configured to perform a later phase of mail sortation, wherein the earlier phase occurs before a transition to the later phase;

at least one information acquisition device, configured to acquire information during the earlier phase comprising at least a total number of pitches occupied by the mail to be sorted in the later phase known after the earlier phase is halted; and at least one processing module, configured to use the information to calculate, while the earlier phase is continuing, a transition time for the transition, wherein, at the transition time, there is sufficient remaining time to perform the later phase prior to a deadline for completing the later phase, and wherein the processing module is further configured to use the information repeatedly, in order to calculate a revised value of the transition time, before the earlier phase is stopped.

24. The mail sorting system of claim 23, wherein the mail sorting system is a single mail sorter, and wherein the first set of sorting equipment and the second set of sorting equipment have at least some equipment in common.

25. The mail sorting system of claim 23, wherein the processing module is further configured to determine whether the earlier phase should be stopped, based at least partly on a difference between the transition time and current actual time.

26. The mail sorting system of claim 25, further including an alert module configured to alert an operator substantially when it is determined that the earlier phase should be stopped.

27. The mail sorting system of claim 23, wherein the earlier phase of mail sortation includes sortation to a first set of batches;

wherein the later phase of mail sortation comprises sortation to a second set of batches; and wherein each of the first set of batches is larger than each of the second set of batches.

28. The mail sorting system of claim 27, wherein the later phase of mail sortation further comprise sortation to delivery sequence.

29. The mail sorting system of claim 23, wherein the first set of sorting equipment comprises a mail loading device configured to move the mail pieces into the mail sorting system, and wherein the second set of sorting equipment comprises a tray loading device configured to move the mail pieces out of the mail sorting system.

30. The mail sorting system of claim 23, wherein information includes:

total number of mail pieces to be sorted;

type of mail pieces; and speed of feeders used for the type of mail.

31. The mail sorting system of claim 23, wherein:

the at least one processing module further calculates a time to complete the later phase, the calculating comprising: [Sorter Path Length+(Total Pitches Occupied)(Efficiency Factor)]/[Transport Speed];

the revised value of the transition time is continuously updated, changing to an earlier time as additional mail pieces are loaded in during the earlier phase;

the information is used to calculate a time for completion of the later phase, which is subtracted from a dispatch deadline to a current required start time for stating the transition from the earlier phase to the later phase; and if the current required start time is substantially later than an actual time, then sorting in the earlier phase continues; and if the current required start time is not substantially later than an actual time, then sorting in the earlier phase stops and the later phase begins.

* * * * *